June 28, 1955  E. P. ANDERSON  2,711,652
GYRO ERECTION SYSTEM
Filed July 22, 1953

INVENTOR.
EDWARD R. ANDERSON
BY
ATTORNEY

United States Patent Office 2,711,652
Patented June 28, 1955

2,711,652
GYRO ERECTION SYSTEM

Edward P. Anderson, Livingston, N. J., assignor to Bendix Aviation Corporation, Teterboro, N. J., a corporation of Delaware Application July 22, 1953, Serial No. 369,672

15 Claims. (Cl. 74—5.44)

This invention relates to a gyro erection system arranged to maintain a gyro with its axis in predetermined orientation, for instance perpendicular to the surface of the earth. Erection systems for this purpose generally include moving elements which are subject to wear and mechanical difficulties; and a general purpose of the invention is to provide an arrangement that is practical and efficient, yet which has no moving parts that can wear or get out of order mechanically.

An object of the invention is to provide a gyro erection system that is actuated entirely by electrical means. A more specific feature is the utilization for this purpose of a position-sensitive device of the type known as a "Convectron" (registered trade-mark of Bendix Aviation Corporation, of Teterboro, New Jersey). This device comprises a glass tube filled with a suitable gas, such as argon, with a very fine thermistor type filament, such as a nickel wire, extending lengthwise in the tube between metal caps at the tube ends. When heated by an electric current to an appropriate degree, the temperature of the filament will depend mainly on the cooling effect of the convection flow of the gas; and as the gas currents flowing past the wire necessarily are vertical, they travel past it at an angle determined by the inclination of the filament to the vertical. The temperature of the filament therefore varies at a fixed rate in accordance with its inclination, becoming hotter and correspondingly lower in resistance as it approaches vertical position, and cooler, with a corresponding increase in resistance, as it approaches the horizontal. By mounting a "Convectron" on the casing of a gyro, deviation of the gyro axis from the proper normal orientation will result in a corresponding change in the angle between the "Convectron" filament and the perpendicular, with a resultant variation in the resistance of the filament. A feature of the invention is the utilization of this variation to restore the gyro axis to its normal orientation.

Another general purpose of the invention is to provide an arrangement which utilizes variations in current flow produced by deviation of a gyro, or other instrumentality to be controlled, from a predetermined position relative to the vertical, to restore the gyro to such position. This is in general accomplished by providing control elements at opposite sides of a vertical line through the gyro when in normal position, and means operated by electrical variations caused by deviation of the gyro from such position to actuate the control elements and thereby restore the gyro to normal position.

A further feature is the utilization of liquid compartments as the control elements, and electrically operated means for transferring liquid from the lower to the higher compartment when the apparatus has deviated from normal position, thereby restoring it to such position. Another feature is the use of liquid compartments containing a volatile liquid, and the utilization of increased current due to axis deviation to heat the liquid in the lower compartment and thereby increase the vapor pressure therein, resulting in the transfer of weight to the higher side, thus restoring the axis to normal position.

The foregoing and other objects of the invention will appear more fully hereafter from consideration of the detailed description which follows, in conjunction with the accompanying drawing in which one embodiment of the invention is illustrated. It is to be expressly understood, however, that the drawings are for the purposes of illustration and description, and are not to be construed as defining the limits of the invention.

Referring now to the drawings which show one embodiment of the present invention:

Figure 1:
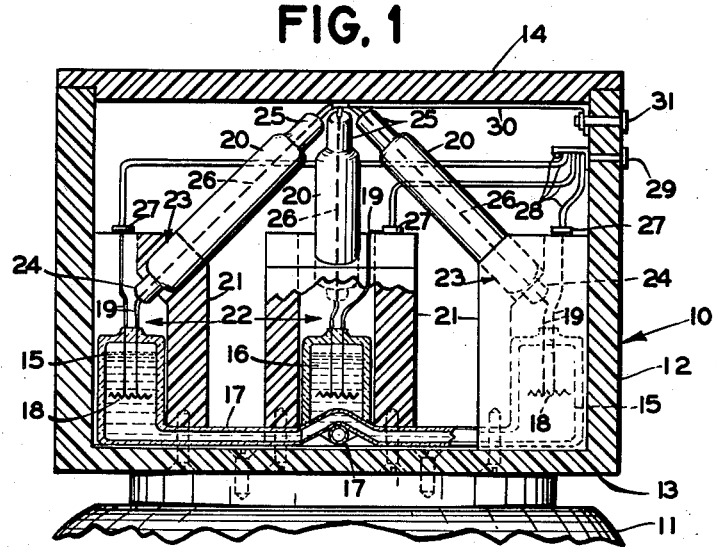
Fig. 1 is a vertical central section on line 1—1 of Fig. 2 through a gyro erection system mounted on the casing of a gyro.
Figure 2:
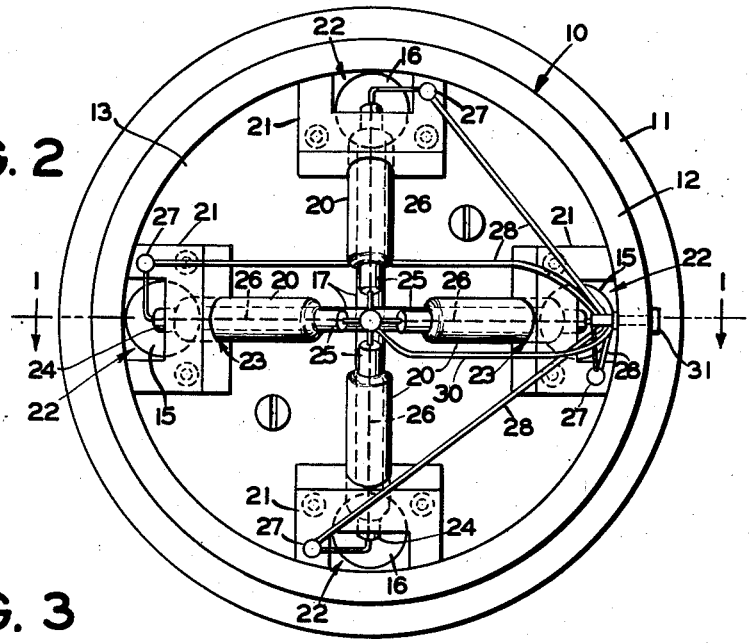
Fig. 2 is a plan view of the system with the casing cover removed.

The illustrated embodiment includes an erector casing 10, mounted on the casing 11 of a gyro. Erector casing 10 includes a side wall 12, bottom 13 and a removable cover 14, all of which may be made of plastic or other suitable material. Mounted in casing 10 are two pairs of liquid compartments 15, 15 and 16, 16, each pair being connected by a conduit 17. The alternating compartments 15 and 16 are located at 90° intervals around a central point, and the conduits 17 may extend along the casing bottom 13 and cross in the middle as shown. Each pair of compartments 15 or 16, and the connecting conduit 17, may be integrally constructed of any suitable material, such as glass or plastic, and are substantially filled with a liquid that is readily volatilized by moderate heat, ethyl ether, methyl monochloride and liquid chlorine having been found suitable for the purpose. A slight gas space is advantageously left at the top of each compartment 15, 16 when the compartments are all in the same horizontal plane, thereby facilitating the development of vapor pressure. An electrical heating arrangement such as wire heater 18 is mounted in each compartment 15, 16 preferably below the liquid level, and its leads 19 extend through the wall of the compartment, which is sealed so that each pair of compartments and the connecting conduit form a closed fluid system.

A "Convectron" 20 is mounted in casing 10 in association with each pair of compartments 15, 16, the "Convectrons" being mounted at the same fixed angle relative to a central vertical line advantageously equidistant from the compartments 15, 16 of each pair. "Convectrons" 20 are advantageously inclined outwardly from said line, circumferentially spaced at intervals of 90° and inclined at the same angle to the axis, each "Convectron" being in vertical alignment with a compartment 15 or 16.

Figure 3:
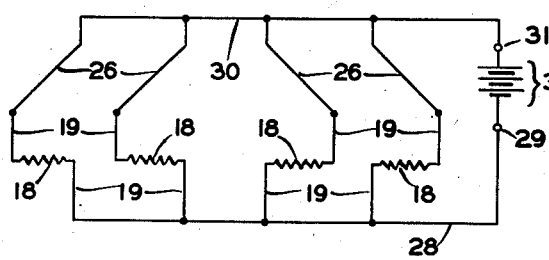
Fig. 3 is an electrical diagram showing the interconnection of the parts.

Various mounting arrangements may be utilized. In the embodiment illustrated, mounting blocks 21 of plastic or other suitable material are fixed to casing 10. Each block 21 includes a recess 22 fitting around a compartment 15 or 16 and the associated conduit 17, and a socket 23 into which the lower end of a "Convectron" is fitted, with its terminal tip 24 projecting into recess 22. The arrangement is such that the "Convectrons" 20 are each inclined toward the central vertical line at an angle of 45°, with an end terminal cap 24 in juxtaposition to a compartment 15 or 16. A fine filament 26, made of nickel or other suitable material of the thermistor type whose resistance varies substantially with changes of temperature, extends longitudinally through each "Convectron" 20 and is connected at its ends to caps 24, 25. Each lower cap 24 is connected to one lead 19 from the associated heating element 18, the other lead of which extends upwardly through recess 22 to a terminal 27 on the top of mounting block 21. Terminals 27 are connected through leads 28 to outer terminals 29 extending through side wall 12 of casing 10. The upper terminal caps 25 are all connected to lead 30 running to the other outer terminal 31, also extending through side wall 12. Terminals 29 and 31 are intended to be connected to a suitable source of heating current, such as battery 32 (Fig. 3).

In operation, when the gyroscope is running in proper position, with its axis vertical in the illustrated embodiment, gyroscope casing 11 will be maintained with its longitudinal axis, which coincides with the above mentioned central vertical line of erector casing 10, accurately aligned in normal position. A certain amount of current will flow from the source 32 through the "Convectron" filaments 26 and heaters 18, so that cooling gas currents will move uniformly upward in all of the "Convectrons," cooling all of the filaments 26 evenly. Under normal conditions the current through each heater 18 will be the same, and the vapor pressure in each pair of compartments 15 and 16 will be the same. Consequently, the weight of the liquid in each of the four compartments will be equal and the erector system will be balanced when the gyro axis is in normal position.

If the axis should deviate to the left as seen in Fig. 1, the lefthand "Convectron" 20 will become more nearly vertical, its filament 26 will become hotter, decreasing its resistance, and more current will flow through the lefthand heater 18, increasing the vapor pressure in the lefthand compartment 15. At the same time the righthand "Convectron" 20 will become more nearly horizontal, increasing the cooling of its filament 26, raising the filament resistance and thereby decreasing the current through the righthand resistor 18. The resultant increase in vapor pressure in the lefthand compartment 15, with a corresponding decrease of vapor pressure in the righthand compartment 15, will result in a flow of liquid from the former compartment to the latter, thereby increasing the weight on the higher side of casing 10 and tending to return the gyro casing 11 to normal position.

The same action will occur if the deviation of the axis occurs along the line connecting compartments 16. A deviation in a vertical plane lying between adjacent compartments will of course raise one compartment of each pair, and the transfer of weight to the higher compartment in each instance will be proportionate to its elevation. Consequently the system provides prompt and proportional correction of all deviations of the gyro axis, and since the difference in vapor pressure at opposite ends of a pair of connected compartments will be in proportion to such deviation and will produce a proportional transfer of liquid weight to the higher side, which will be promptly reduced as the gyro is erected, minimizing any tendency to hunt.

It will be noted that the arrangement is compact, self-contained, entirely electrical in operation and free from all moving parts that might be subject to mechanical difficulties, the only moving element being a liquid, which of course is substantially frictionless and not subject to wear or to material deterioration in a closed circuit when proper care in the selection of the liquid and container is exercised. It is also noted that each balancing unit consisting of a pair of compartments 15 or 16 constitutes a closed system sealed from the outer air.

Although only one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

In particular, while the arrangement illustrated is particularly suitable for use with a gyro having a normally vertical axis, it will be evident that the invention may be used with gyros whose axis is normally at an angle to the vertical, for instance horizontal, as long as the casing or other part of the gyro support structure on which the erecting apparatus is mounted retains a fixed relationship to the gyro axis. Moreover, while a separate "Convectron" for each liquid compartment is shown, it is not necessary under normal conditions that the "Convectrons" should be entirely separate, since a plurality of "Convectrons" may be constructed as a single unit that will function in the manner described.

It will also be understood that while a particular symmetrical arrangement of the liquid compartments has been shown and is of particular value for certain types of installation, the invention in its broader aspects is not restricted to such an arrangement, since it may be applied to other types including previous gyro units provided with other arrangements of liquid compartments. Likewise, certain features of the invention are equally applicable to constructions having only a single pair of connected compartments. Thermistors of the "Convectron" type as described herein will be referred to simply as convection controlled thermistors.

I claim:

1. A gyro deviation correcting system comprising a gyro having its axis of rotation normally aligned in a predetermined direction, a gyro support having a fixed alignment with said axis, and deviation correcting apparatus mounted on the support, including a first pair of liquid compartments at opposite sides of the vertical central line through the gyro, a liquid channel connecting the compartments, a second pair of liquid compartments on opposite sides of said line and intermediate with the first pair, a liquid channel connecting the second pair of compartments, each pair of compartments being horizontally aligned when the gyro axis is normally aligned, liquid in said compartments and channels, and position-responsive control apparatus including means responsive to deviations of the first pair of compartments from their horizontal alignment for forcing a liquid from the lower to the upper compartment of the first pair, and means responsive to deviations of the second pair of compartments from their horizontal alignment for forcing liquid from the lower to the upper compartment of the second pair.

2. A gyro deviation correcting system comprising a gyro having its axis of rotation normally aligned in a predetermined direction, a gyro support having a fixed alignment with said axis, and deviation correcting apparatus mounted on the support, including a first pair of liquid compartments at opposite sides of the vertical central line through the gyro, a liquid channel connecting the compartments, a second pair of liquid compartments on opposite sides of said line and intermediate with the first pair, a liquid channel connecting the second pair of compartments, each pair of compartments being horizontally aligned when the gyro axis is normally aligned, liquid in said compartments and channels, and position-responsive control apparatus including a first position-responsive unit, means actuated by said unit for forcing liquid from the lower to the upper of the first pair through the connecting channel, a second position-responsive unit, and means actuated by said second unit for forcing liquid from the lower to the upper compartment of the second pair through the connecting channel.

3. A gyro erecting system comprising a gyro having its axis of rotation normally aligned in a predetermined direction, a gyro support having a fixed alignment with said axis, a pair of liquid compartments mounted on the support at opposite sides of the vertical center line of the gyro, a liquid channel connecting the compartments, said compartments being horizontally aligned when the gyro axis is normally aligned, liquid in said compartments and channel, electrical means for forcing liquid from either compartment to the other compartment through said channel, and means responsive to deviations of the gyro axis from said normal alignment for actuating the electrical means to force the liquid from the lower to the higher compartment.

4. A system as claimed in claim 3, in which a source of electrical energy is connected to the electrical means and the deviation responsive means, and said responsive means includes means responsive to changes in its orientation for varying the supply of electrical energy from said source to said electrical means.

5. A gyro erecting system comprising a gyro having its axis of rotation normally aligned in a predetermined direction, a gyro support having a fixed alignment with said axis, a pair of liquid compartments mounted on the support at opposite sides of the vertical center line of the gyro, a liquid channel connecting the compartments, said compartments being horizontally aligned when the gyro axis is normally aligned, electrical means for forcing liquid from either compartment to the other compartment through said channel, and means responsive to deviations of the gyro axis from said normal alignment for actuating the electrical means to force the liquid from the lower to the higher compartment, said responsive means comprising a convection controlled thermistor in circuit with said electrical means.

6. A gyro erecting system comprising a gyro having its axis of rotation normally aligned in a predetermined direction, a gyro support having a fixed alignment with said axis, a pair of liquid compartments mounted on the support at opposite sides of the vertical center line of the gyro, a liquid channel connecting the compartments, liquid in said compartments and channel, said compartments being horizontally aligned when the gyro axis is normally aligned, electrical means associated with one compartment for forcing liquid from said compartment to the other compartment through said channel, means responsive to deviations of the gyro axis from normal alignment which lower the latter compartment for actuating the electrical means and thereby forcing liquid from the latter compartment to the higher compartment, electrical means for forcing liquid from the second compartment to the first compartment, and means responsive to deviation of the gyro axis from said normal alignment for actuating the second electrical means and thereby forcing liquid from the lower second compartment to the higher first compartment.

7. A gyro erecting system comprising a gyro having its axis of rotation normally aligned in a predetermined direction, a gyro support having a fixed alignment with said axis, a pair of liquid compartments mounted on the support at the opposite sides of the vertical central line of the gyro, a liquid channel connecting the compartments, said compartments and channel forming a closed system, liquid in the compartments and channel, gas above the liquid in each compartment, and means responsive to deviations of the gyro axis from said normal orientation for forcing liquid from the lower compartment to the higher compartment, comprising means for increasing the gas pressure in the lower compartment.

8. A system as claimed in claim 7, in which the responsive means includes means for reducing the gas pressure in the higher compartment.

9. A gyro deviation erecting system comprising a gyro having its axis of rotation normally aligned in a predetermined direction, a gyro support having a fixed alignment with said axis, a pair of liquid compartments mounted on the support at opposite sides of the vertical center line of the gyro, a liquid channel connecting the compartments, liquid in said compartments and channel, gas above the liquid in each compartment, said compartments being horizontally aligned when the gyro axis is normally aligned, and position responsive control apparatus, including means for varying the gas pressure above the liquid in each compartment, and means responsive to the deviation of the gyro axis from said normal alignment for actuating the varying means to increase the gas pressure in the lower compartment and decrease the gas pressure in the upper compartment.

10. A gyro deviation correcting system comprising a gyro having its axis of rotation normally aligned in a predetermined direction, a gyro support having a fixed alignment with said axis, and a deviation correcting apparatus mounted on the support, including a pair of liquid compartments at opposite sides of the vertical center line of the gyro, a liquid channel connecting the compartments, said compartments and channel comprising a closed system, a liquid readily volatized by heat in the compartments and channel, gas above the liquid in each compartment, said compartments being horizontally aligned when the gyro axis is normally aligned, a liquid heater associated with a compartment, and a position responsive heater-actuating device arranged to actuate the heater, thereby increasing the gas pressure and forcing the liquid from the associated compartment to the other compartment, when deviation of the gyro axis from normal alignment lowers the associated compartment below the level of the connected compartment.

11. A system as claimed in claim 10, in which the position responsive device comprises a convection controlled thermistor in circuit with the liquid heater.

12. A gyro deviation correcting system comprising a gyro having its axis of rotation normally aligned in a predetermined direction, a gyro support having a fixed alignment with said axis, and a deviation correcting apparatus mounted on the support, including a pair of liquid compartments at opposite sides of the vertical center line of the gyro, a liquid channel connecting the compartments, said compartments and channel comprising a closed system, a liquid readily volatized by heat in the compartments and channel, said compartments being horizontally aligned when the gyro axis is normally aligned, an electrical heating element immersed in the liquid in a compartment, and a position responsive resistor in circuit with the heater, arranged to decrease resistance and thereby increase the current through the heater when deviation of the gyro axis from normal alignment lowers the latter compartment below the level of the connected compartment.

13. A gyro deviation correcting system comprising a gyro having its axis of rotation normally aligned in a predetermined direction, a gyro support having a fixed alignment with said axis, and a deviation correcting apparatus mounted on the support, including a pair of liquid compartments, at opposite sides of the vertical center line of the gyro, a liquid channel connecting the compartments, said compartments and channel comprising a closed system, a liquid readily volatilized by heat in the compartments and channel, said compartments being horizontally aligned when the gyro axis is normally aligned, an electrical liquid heater in each compartment, and a position responsive energizing unit in circuit with said heaters and a source of electrical energy, arranged to increase the current in the liquid heater of the lower compartment when the compartments are shifted out of horizontal alignment by deviation of the gyro axis from normal alignment.

14. A gyro deviation correcting system comprising a gyro having its axis of rotation normally aligned in a predetermined direction, a gyro support having a fixed alignment with said axis, and a deviation correcting apparatus mounted on the support, including a pair of liquid compartments at opposite sides of the vertical center line of the gyro, a liquid channel connecting the compartments, said compartments and channel comprising a closed system, a liquid readily volatilized by heat in the compartments and channel, said compartments being horizontally aligned when the gyro axis is normally aligned, an electrical liquid heater in each compartment, and a position responsive control unit in circuit with both of said heaters and a source of electrical energy, arranged to maintain equal current through both heaters when the compartments are horizontally aligned and to increase the current through the heater in the lower compartment while decreasing the current through the heater in the upper compartments, when the compartments are shifted out of horizontal alignment by the deviation of the gyro axis from normal alignment.

15. A gyro deviation correcting system comprising a gyro having its axis of rotation normally aligned in a predetermined direction, a gyro support having a fixed alignment with said axis, and a deviation correcting apparatus mounted on the support, including a pair of liquid compartments at opposite sides of the vertical central line through the gyro, a channel connecting the compartments, said compartments being horizontally aligned when the gyro axis is normally aligned, a liquid readily volatized by heat in the compartments and channel, electrical liquid heating element immersed in the liquid in each compartment, a heater circuit through which equal current normally passes through said heating elements, a convection controlled thermistor in circuit with one of the elements, arranged to reduce its resistance and thereby increase the current through the latter heating elements, thereby forcing liquid out of the compartment containing the latter element and into the other compartment, when the position of the thermistor is changed by deviation of the gyro axis from its normal alignment.

References Cited in the file of this patent

UNITED STATES PATENTS

| | | |
|---|---|---|
| 1,773,172 | Davis | Aug. 19, 1930 |
| 1,866,733 | Tanner | July 12, 1932 |
| 2,440,189 | Zworykin | Apr. 20, 1948 |
| 2,530,154 | Davis | Nov. 14, 1950 |